United States Patent [19]

Arnold et al.

[11] Patent Number: 4,724,438

[45] Date of Patent: Feb. 9, 1988

[54] RADAR APPARATUS

[75] Inventors: Christopher J. Arnold; Caspar P. A. van den Broek, both of Danbury, England

[73] Assignee: The Marconi Company Limited, Stanmore, England

[21] Appl. No.: 658,411

[22] Filed: Oct. 5, 1984

[30] Foreign Application Priority Data

Oct. 7, 1983 [GB] United Kingdom ............... 8326919

[51] Int. Cl.$^4$ .................. G01S 13/72; G01S 13/88
[52] U.S. Cl. .................................. 342/157; 342/81; 342/195; 342/372; 367/103
[58] Field of Search .................. 343/5 DP, 7 A, 7.5, 343/17.1 R, 7.6, 17.2 R; 342/81, 83, 88, 107, 131, 157, 158, 195, 201, 202, 371, 372, 377

[56] References Cited

U.S. PATENT DOCUMENTS 3,344,426 9/1967 Long .......................... 343/17.2 R

FOREIGN PATENT DOCUMENTS 1278419 6/1972 United Kingdom.
1316986 5/1973 United Kingdom.
1343415 1/1974 United Kingdom.
1343414 1/1974 United Kingdom.
1361681 7/1974 United Kingdom.
1509166 4/1978 United Kingdom.
1515539 6/1978 United Kingdom.

OTHER PUBLICATIONS

Sarig et al., "Implementation of a Distributed Node of Radar Control", IEEE Radar Conf., Arlington, Va., U.S.A., Apr. 1980, pp. 113-122.
Farina et al., Multitarget Interleaved Tracking for Phased-Array Radar, IEE Proc., vol. 127, Pt. F, vol. 4, Aug. 1980, pp. 312-318.

Primary Examiner—Theodore M. Blum
Assistant Examiner—Gilberto Barrón, Jr.
Attorney, Agent, or Firm—Spencer & Frank

[57] ABSTRACT

The invention relates to a radar system of the type which can be presented with a number of tasks to be performed. Some of these tasks, e.g. the surveillance of areas at close range, may only require the transmission of low energy pulses and thus the full potential of the r.f. energy source has not previously been used while such tasks are being handled. By arranging for the tasks to be performed in a suitable overlapping sequence the full capability of the energy source is used at all times thereby increasing the throughput of tasks.

10 Claims, 4 Drawing Figures

RADAR APPARATUS

BACKGROUND OF THE INVENTION

This invention relates to a radar apparatus which is defined for the purpose of this description as apparatus which derives information about its environment by transmitting energy and sensing the direction and timing of energy after reflection or re-transmission from a feature in the environment. Thus, as well as being applicable to conventional radar operating at microwave frequencies, the invention is also applicable to optical and infra-red radar and to sonar apparatus.

A radar is sometimes required to perform a number of specified tasks such as tracking particular targets and-/or searching certain specified areas of its environment for targets which present a threat. One way in which this might be done is on a purely priority basis: i.e. those tasks which are considered most urgent (e.g. because they appear first) are started and completed before commencing less urgent tasks. Whilst a system operating on a priority basis can ensure that tasks are performed in the best order, it does not allow the radar to handle an increased workload. This invention is concerned with the problem of allowing an increased workload to be handled.

SUMMARY OF THE INVENTION

The object of this invention is to enable a radar to handle an increased workload e.g. by performing more tasks in a given time or by reducing the time taken to complete certain defined tasks.

The invention arose from the realisation that not all tasks need employ the maximum power available from the source of energy and that it should therefore be possible to reduce the time needed to perform a given number of tasks (or to increase the number of tasks which can be performed in a given time) by organising the tasks in a sequence such that some of them, not individually requiring maximum available output power, overlap each other or are conducted simultaneously.

Accordingly the invention provides radar apparatus comprising a source of energy to be radiated, means for storing information defining characteristics of different tasks requiring respective different proportions of available power from the source, and means for establishing a sequence of overlapping and/or co-extensive tasks so as to make more complete use of the available power from the source compared with a sequence in which the tasks proceed serially.

The different tasks will normally involve the transmission of energy in respective different directions and for this reason the apparatus preferably includes a phased array antenna to enable rapid changes in the direction of transmission to be made. It is not however, essential that the different tasks be characterised by different directions of transmission. Other possibilities are: different range brackets, different frequencies, different bandwidths, different pulse repetition frequencies, different pulse lengths, different frequency coding or phase coding, different transmission amplitudes and different Doppler shifts in the received signal.

Whilst the invention could conceivably be applied to continuous wave radar it is considered to be primarily applicable to pulse radar in which latter case the pulses associated with the overlapping or co-extensive tasks may advantageously be interleaved. Where, as will normally be the case, the different tasks are characterised by transmissions in different directions, this can conveniently be accomplished using a conventional source of microwave energy to generate initially fixed duration, fixed amplitude pulses which will be referred to as "main pulses" and changing the direction of transmission at least once during a pulse so as to produce what will be referred to as "sub-pulses" transmitted and received in different directions.

In embodiments where different pulses or sub-pulses are transmitted for different tasks, these pulses can be suitably coded (e.g. using frequency, phase or amplitude characteristics) to identify their tasks. This facilitates identification of the pulses on reception. Such coding is not however essential as will be apparent from the following description of the system in which the direction of reception of a sub-pulse is sufficient to identify it as belonging to a given task.

DETAILED DESCRIPTION OF THE PREFERRED EMBODIMENTS

Figure 1:
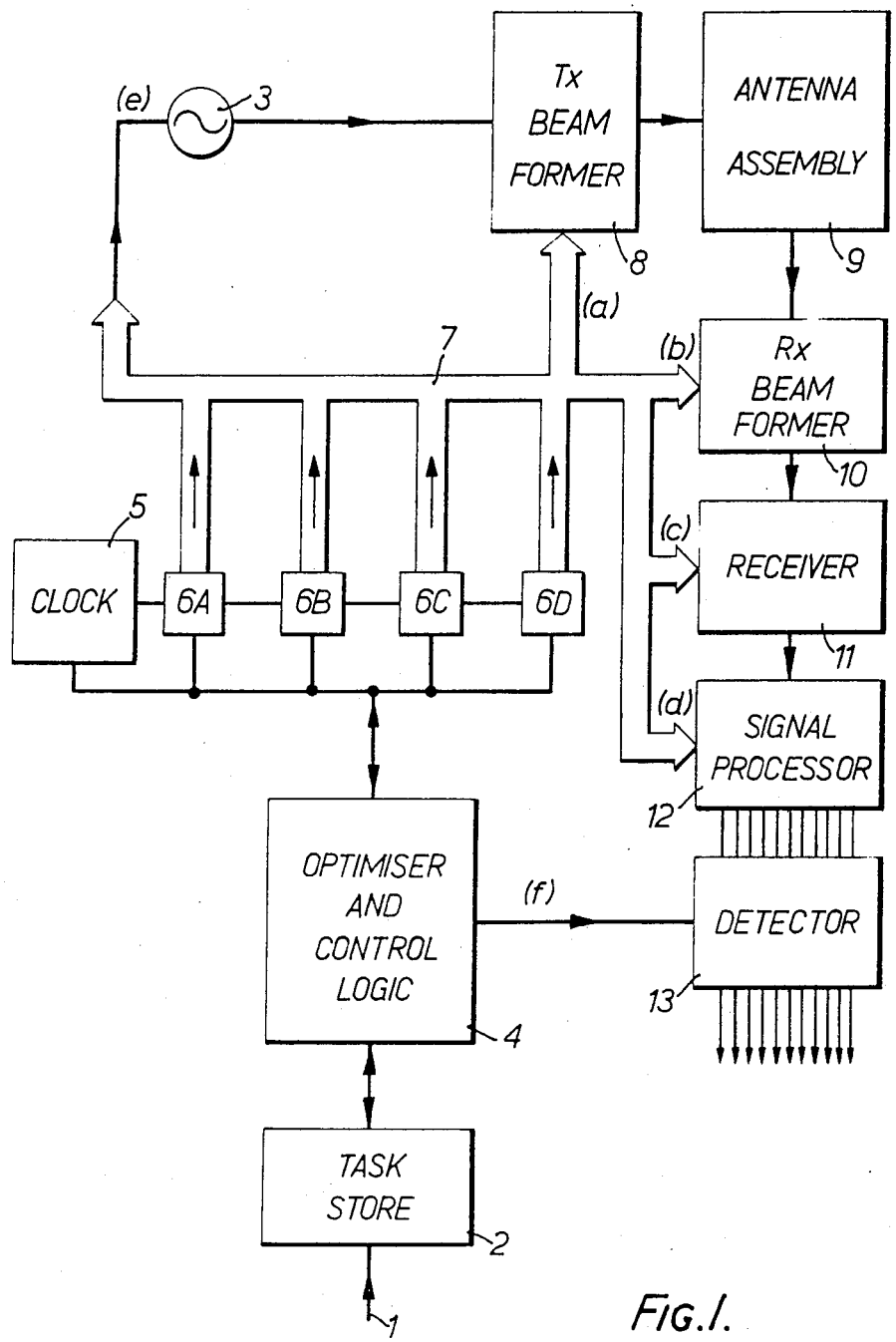
FIG. 1 is a block diagram of a radar system constructed in accordance with the invention.

Identification of and details of tasks to be performed are presented on line 1 of FIG. 1 and, by way of example, ten particular tasks $T_1$ to $T_{10}$ will be considered in this description. The details of these tasks are given in the following table and these details are stored in binary digital form in a store 2. The energy units referred to in the table are equal to the energy transmitted during each 1 $\mu$second of a 10 $\mu$seconds transmitted pulse, this being the minimum quantum of energy which the apparatus is capable of transmitting in a given direction (the direction can only be changed nine times during each pulse).

The store 2 is a binary store used to store the backlog of tasks to give the optimiser 4 a choice. A standard high speed computer store with a standard interface unit would be suitable such as is available for the VME bus processing systems, from Performance Technologies Inc., 300 Main St, East Rochester, N.Y. 14445.

| | RANGE (KM) | | DIRECTION CODE | MINIMUM ENERGY REQUIREMENT | PULSES/TASK | |
|---|---|---|---|---|---|---|
| TASK | MIN. | MAX. | | | MIN. | MAX. |
| T1 | 100 | 150 | A | 850 | 85 | 100 |
| T2 | 50 | 100 | A | 200 | 20 | 100 |
| T3 | 0 | 50 | A | 12.5 | 2 | 100 |
| T4 | 40 | 50 | B | 100 | 10 | 20 |
| T5 | 80 | 81 | C | 90 | 9 | 50 |
| T6 | 14 | 15 | D | 0.4 | 6 | 50 |
| T7 | 30 | 35 | E | 20 | 3 | 50 |
| T8 | 0 | 30 | C | 20 | 5 | 50 |
| T9 | 51 | 52 | F | 2 | 1 | 100 |
| T10 | 5 | 6 | G | 0.004 | 6 | 50 |

The tasks to be performed, presented on line 1 will normally be derived from a radar system management computer as is known per se.

Figure 2:
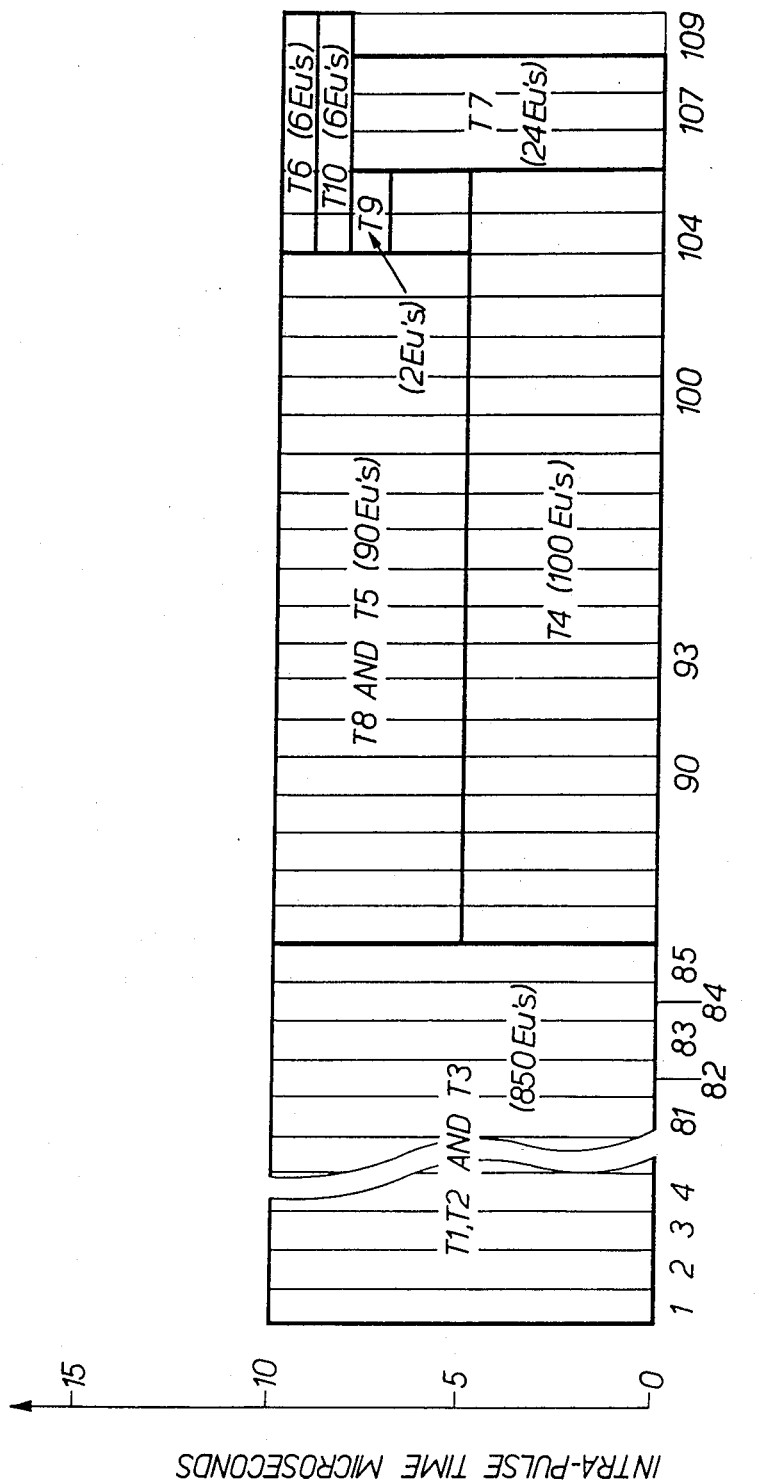
FIG. 2 is a pictorial representation of one hundred and nine pulses transmitted for the purpose of completing ten specified tasks.

The content of the store 2 is inspected by an optimiser and controller 4 which is designed to establish an overlapping sequence in which the tasks can be performed so as to use the maximum power available from a source 3 of microwave energy at all times thereby completing the tasks in the minimum time. The way in which the optimiser 4 schedules the tasks $T_1$ to $T_{10}$ is shown in FIG. 2 where each vertical column numbered 1 to 109 represents one main pulse of energy generated by the source 3 and transmitted at constant amplitude in a direction which changes during some of the main pulses so as to divide them into sub-pulses. Each main pulse is considered on FIG. 2 to start at a time t=0 and to finish at a time t=10 μseconds as indicated on the vertical co-ordinate.

Referring to FIG. 2 it can be seen that the optimiser has scheduled the first eighty-five main pulses to be allocated to tasks $T_1$, $T_2$, and $T_3$ which involve transmission in direction A. Each of the pulses 86 to 103 is divided into two sub-pulses so that, for the first 5 μseconds it is transmitted in direction B for the purpose of task $T_4$ and in the last 5 μseconds it is transmitted in direction C for the purposes of tasks $T_5$ and $T_8$. Each of the main pulses 104 and 105 are divided into four subpulses as follows: during its first 5 μseconds it is transmitted in direction B for the purpose of task 4; during its next 2 μseconds it is suppressed; during its next 3 μseconds it is transmitted in directions F, G, and D respectively for the purposes of tasks $T_9$, $T_{10}$ and $T_6$ respectively. Each of the pulses 106, 107 and 108 is divided into 3 sub-pulses as follows: during its first 8 μseconds it is transmitted in direction E for the purposes of tasks $T_7$; during its next 1 μsecond it is transmitted in direction G for the purpose of task $T_{10}$ and during its final 1 μsecond it is transmitted in direction D for the purpose of task $T_6$.

Finally, pulse 109, is suppressed during its first 8 μseconds and its final 2 μseconds is divided into two equal sub-pulses, the first being transmitted in direction G for the purpose of task $T_{10}$ and the last being transmitted in direction D for the purpose of task $T_6$.

Another function of the optimiser 4 is to provide a signal on line f (FIG. 1) describing detection criteria for each task. In this connection it will be appreciated that some tasks may specify that some indication be given when for example a target of greater than a certain size is detected or results in a received signal having greater than a specified amplitude.

Figure 3:
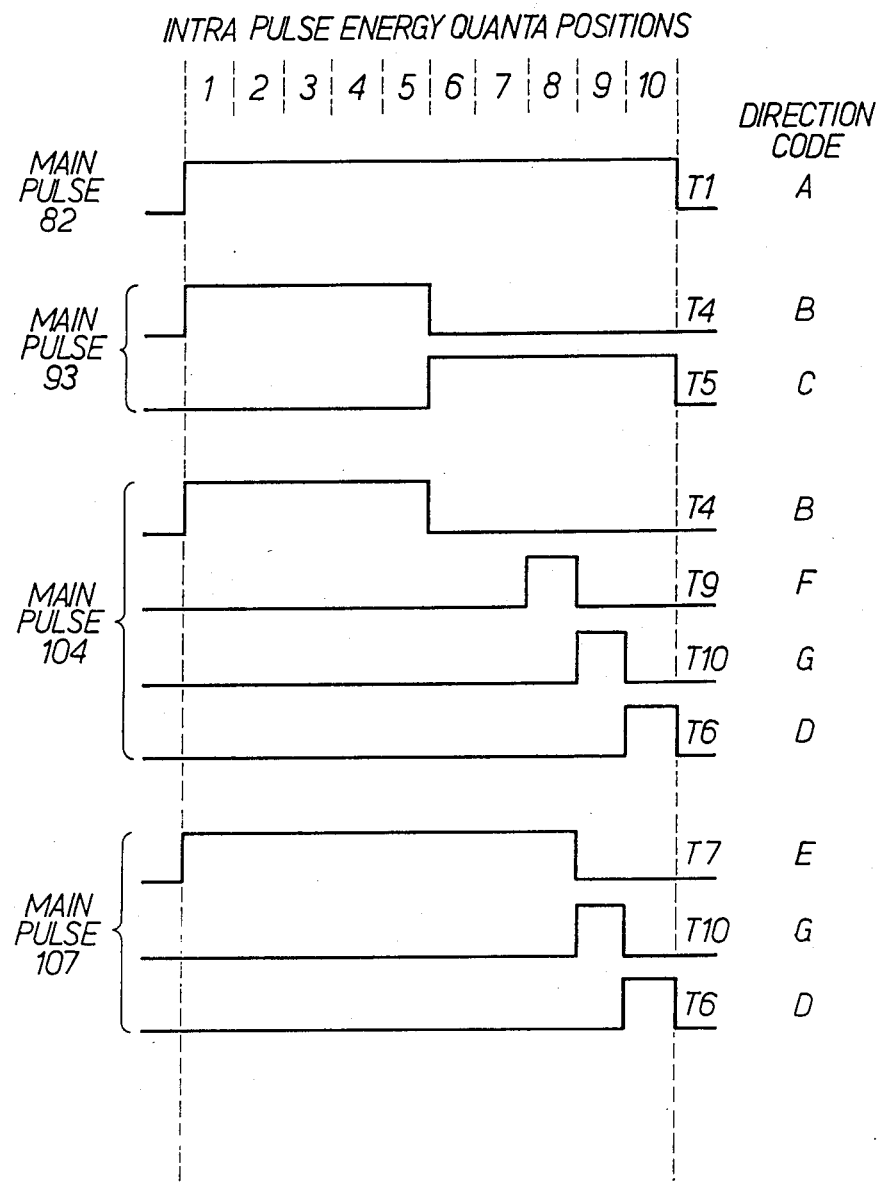
FIG. 3 is a diagram showing the time and direction of transmission for four representative main pulses 82, 93, 104 and 107.

FIG. 3 shows more clearly the directions in which energy is to be transmitted during representative pulses 82, 93, 104 and 107.

Figure 4:
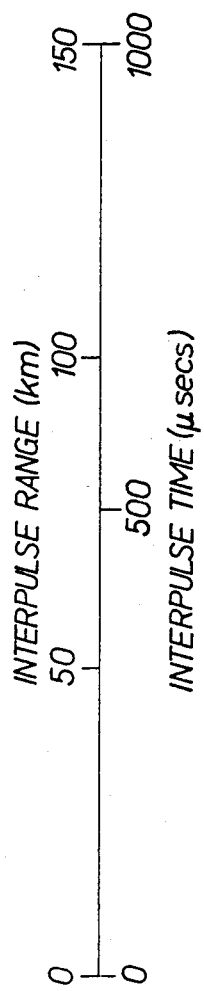
FIG. 4 is a diagram showing the times for reception of return signals derived from the four representative main pulses shown in FIG. 3.

In addition to its function of determining the times for the transmission of signals in different directions, the optimiser 4 also determines the time for reception from different directions, this depending on the range brackets of interest as set out in the foregoing table. For each complete transmitted pulse the optimiser needs to calculate the appropriate times when the receiver must respond to signals arriving in different directions. FIG. 4 shows this for the representative pulses $T_1$, $T_2$, $T_3$ and $T_4$.

The optimiser 4 can be provided with one or more high speed computers such as those based on the 68000 microprocessor of Performance Technologies Inc. The computer would implement a standard dynamic restrained optimisation function following techniques as described in the Book by L. Pontryagin et al entitled "A Mathematical Theory of Optional processors" published in 1962 by John Wiley & Sons.

Referring to FIG. 1, clock 5 generates timing signals for the purpose of initiating transmission of a complete pulse, and for the purpose of defining the ten time periods, within a pulse, between which the direction can be changed. At the beginning of each pulse, details of the task to be performed during that pulse together with the times for reception from different directions calculated as described in the immediately preceding paragraph are entered in the respective task control units 6A, 6B, 6C and 6D, each of which serves to generate from the data in the optimiser 4, signals appropriate to a given task which are applied via a real time bus 7, onto lines (a), (b), (c), (d) and (e) appropriate to a given task. The signals applied to these lines are as follows.

line (a) this line carries a signal, occurring at the required time of transmission for the appropriate subpulse, and representing the direction of transmission.

line (b) this line carries a signal, occurring at the time for reception of a pulse (which depends on the range specified for the appropriate task) and representing the direction of reception, which will normally be the same as the direction of transmission.

line (c) this line carries a signal, also occurring at the time for reception of each sub-pulse, representing the bandwidth of the sub-pulse (which is a direct function, calculated in the optimiser and passed to the task control unit, of the duration of the sub-pulse).

line (d) this line carries data specifying the identity of the task associated with a received sub-pulse currently expected.

line (e) this is simply a trigger signal derived directly from the clock 5 used to initiate the generation of each main pulse by the source 3 of microwave energy.

The circuits 6A, 6B, 6C and 6D are all identical and could be implemented by standard medium scale integrated devices such as Texas Instruments 74 Series and MMI Pal Series implemented into a circuit using standard digital design techniques given in the manufacturers application notes.

The signal on line (a) is applied to a transmitter beam former 8 which is a standard electrically stored beam former following principles as described in the book "Radar Handbook" by Skolnik published by McGraw Hill. It serves to control, in accordance with the signal received on line (a), the phase of the signal from the source 3 as applied to each element of an antenna array 9. By controlling the phase in this way the direction of the transmitted beam is controlled.

The antenna assembly consists of an array of radiating elements, e.g. dipoles as is well known in phased array antenna systems.

The signal on line (b) is similar to that on line (d) and controls a second beam former 10 similar to the beam former 8 but used to control the directions from which signals are received.

The signal on line (c) is used to control the receiver 11 so as to vary its bandwidth in this particular embodiment of the invention. The variable bandwidth may be achieved by changing the coefficients of a digital matching filter. In other embodiments a similar signal could be used to control the centre frequency.

The signal on line (d) controls a signal processor 12 where it serves to direct its input into one of ten integrators corresponding to the ten specified tasks. The pulse returns associated with the different tasks are integrated into the respective integrators over a number of pulse repetition periods.

The processor 12 includes a digital filter and correlator designed for the extraction of target information in the background of unwanted signals. A GP1OP linked with an AP12OB, both made by Floating Point Systems, P.O. Box 23489 Portland, Oreg., USA, and a PDP11 made by Digital Equipment Corporation of Magnat, Mass. 01754, USA could be used with the signal processing libraries supplied with them. The integration function controlled by the signal on line (d) would be implemented on the GP1OP.

The output of the integrators are presented on ten output lines to a detection and identification circuit 13 where these signals are compared with the detection criteria defining the accuracy and confidence required from the extracted information associated with a task on line (f). The circuit 13 can be incorporated as part of the same PDP11 mentioned previously. The outputs of the circuit 13 constitute the results of the ten tasks.

We claim:

1. Radar apparatus comprising
   a source of energy to be radiated;
   means for storing information defining characteristics of different tasks requiring respective different proportions of available power from said source;
   means for transmitting pulses of energy, different pulses being associated with different tasks and each task having a plurality of pulses associated therewith;
   means for establishing a sequence of overlapping and/or co-extensive tasks so as to make more complete use of the available power from said source compared with a sequence in which the tasks proceed serially, by interleaving pulses for overlapping or co-extensive tasks and wherein the source of energy generates initial pulses or fixed duration; and
   means for changing the direction of transmission during said initial pulses thereby forming sub-pulses transmitted in different directions with respective different tasks.

2. Radar apparatus according to claim 1, wherein said means for transmitting pulses comprises a phased array antenna for radiating the energy in the different directions.

3. Radar apparatus according to claim 1, further comprising means for coding the transmitted pulses so as to identify the respective tasks.

4. A radar apparatus for transmitting and receiving interleaved pulses which are associated with different tasks, each of said tasks having a plurality of pulses associated therewith, the different tasks being organized in an overlapping sequence comprising:
   source means for generating main pulses of fixed duration;
   storage means for receiving information which represents the different tasks and which requires different amounts of power from said source means;
   optimiser and control logic means connected to said storage means for organizing the different tasks into the overlapping sequence;
   antenna means for transmitting and receiving the interleaved pulses;
   direction controlling means interposed between said source means and said antenna means for controlling the direction of transmission of the main pulses thereby forming sub-pulses which are transmitted and received in different directions via said antenna means; and
   control means connected to said optimiser and control logic means, to said direction controlling means and to said source means for generating, in response to the output of said optimiser and control logic means, a first control signal for determining the direction of transmission of said sub-pulses and a second control signal initiating the generation of said main pulses.

5. Radar apparatus according to claim 4, further comprising a beam former means connected to said antenna means for controlling the directions from which pulses are received, said beam former means being further connected to said control means for receiving a control signal which represents the direction of reception.

6. Radar apparatus according to claim 5, further comprising: receiver means connected to said beam former means for receiving pulses and connected to said control means for receiving a control signal which represents the bandwidth of the subpulse.

7. Radar apparatus according to claim 6, further comprising: signal processing means connected to said receiver means and connected to said control means for receiving a control signal which represents the task associated with a sub-pulse currently expected.

8. Radar apparatus according to claim 7, further comprising: detector means connected to said signal processor means for receiving signals which represent different tasks and connected to said optimiser and control logic means for receiving detection criteria which define the accuracy associated with the task.

9. Radar apparatus according to claim 1 wherein all of said sub-pulses within each initial pulse are of the same frequency.

10. Radar apparatus according to claim 4 wherein all of said sub-pulses within each main pulse are of the same frequency.

* * * * *